(12) United States Patent
Marche et al.

(10) Patent No.: US 8,251,310 B2
(45) Date of Patent: Aug. 28, 2012

(54) SAIL WING AIRCRAFT WHICH INCLUDES AN ENGINE MOUNTED ON A PYLON

(75) Inventors: Herve Marche, Toulouse (FR); Fabien Raison, Plaisance du Touch (FR)

(73) Assignee: Airbus Operations SAS, Toulouse (FR)

( * ) Notice: Subject to any disclaimer, the term of this patent is extended or adjusted under 35 U.S.C. 154(b) by 614 days.

(21) Appl. No.: 12/509,906

(22) Filed: Jul. 27, 2009

(65) Prior Publication Data

US 2010/0108802 A1    May 6, 2010

(30) Foreign Application Priority Data

Aug. 4, 2008  (FR) ...................................... 08 55387

(51) Int. Cl.
*B64D 27/14* (2006.01)
(52) U.S. Cl. ................ 244/54; 244/55; 244/36; 60/796; 60/797; 248/554
(58) Field of Classification Search .................... 244/36, 244/54, 55; D12/319, 345; 248/554–557; 60/796, 797
See application file for complete search history.

(56) References Cited

U.S. PATENT DOCUMENTS

| | | | | |
|---|---|---|---|---|
| 5,271,218 A | * | 12/1993 | Taylor | 60/797 |
| 5,474,258 A | * | 12/1995 | Taylor et al. | 244/54 |
| 7,240,877 B2 | * | 7/2007 | Cazals et al. | 244/54 |
| 2004/0195454 A1 | | 10/2004 | Page et al. | |

FOREIGN PATENT DOCUMENTS

| | | |
|---|---|---|
| FR | 2 909 358 | 6/2008 |
| GB | 801832 | 9/1958 |

* cited by examiner

*Primary Examiner* — Tien Dinh
*Assistant Examiner* — Nicholas McFall
(74) *Attorney, Agent, or Firm* — Oblon, Spivak, McClelland, Maier & Neustadt, L.L.P.

(57) ABSTRACT

Sail wing aircraft which includes a wing (6) and at least one propulsion engine (8). It includes an upper beam (22) which is firmly fixed at its front end to a first frame (12) located on an air inlet (14) of the propulsion engine and which is in addition firmly fixed at its median part to a second frame (16) located to the rear of the first frame. The sail wing aircraft includes in addition a pylon (26) for attachment of the engine onto the fuselage, where the engine is fixed to the pylon (26).

7 Claims, 4 Drawing Sheets

SAIL WING AIRCRAFT WHICH INCLUDES AN ENGINE MOUNTED ON A PYLON

The invention relates to a sail wing aircraft which includes a wing and at least one propulsion engine.

Sail wing aircraft are so called because of their overall appearance which, in aerodynamic terms at least, does not allow a clear distinction to be made between the fuselage and the wing, as is the case with conventional aircraft which are made up of a cylindrical fuselage to which the wing is added. Document FR 2 909 358 describes a sail wing aircraft of this type.

The subject of the present invention is a sail wing aircraft of this type which includes an original engine attachment system.

This aim is achieved, according to the invention, by the fact that the sail wing aircraft includes an upper beam which is firmly fixed at its front end to a first frame located on an air inlet of the propulsion engine and which is in addition firmly fixed at its median part to a second frame located to the rear of the first frame, with the sail wing aircraft including in addition a pylon for attaching the engine to the fuselage, to which pylon the engine is fixed.

Advantageously, the sail wing aircraft includes a third frame located to the rear of the second frame.

The sail wing aircraft generally includes a fan cover hinged on the upper beam between the first and second frame.

Again, the sail wing aircraft generally includes a thrust reverser cover hinged on the upper beam to the rear of the second frame.

The pylon advantageously includes two points for attachment of the pylon to the fuselage at its front end, two points for attachment of the pylon to the fuselage in its median part and one point for attachment of the pylon to the fuselage at its rear end.

In one construction option the pylon includes three points for attaching the engine to the pylon at its median part and two points for attaching the engine to the pylon at its rear end.

In addition the invention relates to a procedure for mounting a propulsion engine onto a sail wing aircraft, characterised by the fact that:

a cut-out is provided in the fuselage;

an upper beam is provided above the cut-out in the fuselage;

the engine is pre-assembled on a support pylon;

the assembly formed by the engine and the support pylon is hoisted up through the cut-out in the fuselage by hooking onto the upper beam;

the pylon is fixed onto the fuselage;

the assembly formed by the engine and the support pylon is released from the upper beam so that there is no longer any mechanical link between the upper beam and the propulsion engine after the assembly formed by the engine and the pylon has been hoisted.

Other characteristics and advantages of the invention will also become apparent on reading the following description of a construction option given for illustrative purposes and with reference to the appended figures. In these figures.

Figure 1:
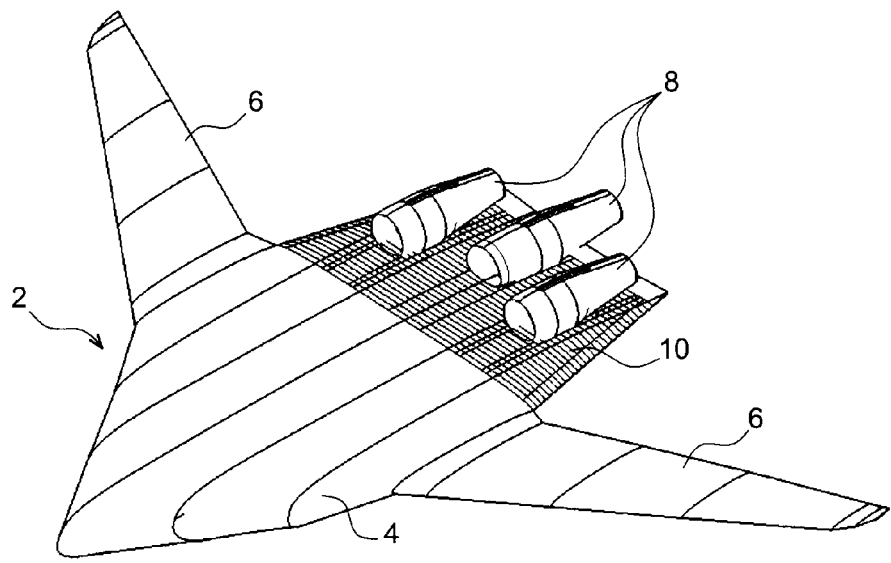
FIG. 1 is schematic perspective view of a sail wing aircraft equipped with three engines on the upper surface of the wing.

Represented in FIG. 1 is a perspective schematic view of a sail wing aircraft 2. The latter is made up of a fuselage 4 and two wings 6. As has been explained, there is no clear distinction between the fuselage 4 and the two wings 6. Similarly, the sail wing aircraft has no conventional tailplane, which on most aircraft with a fuselage is fixed to the rear part of the fuselage.

The engines 8, which are for example three in number, are fixed to the upper wing surface 10 of the sail wing aircraft. The engines 8 are fitted in a "semi-recessed" manner.

Figure 2:
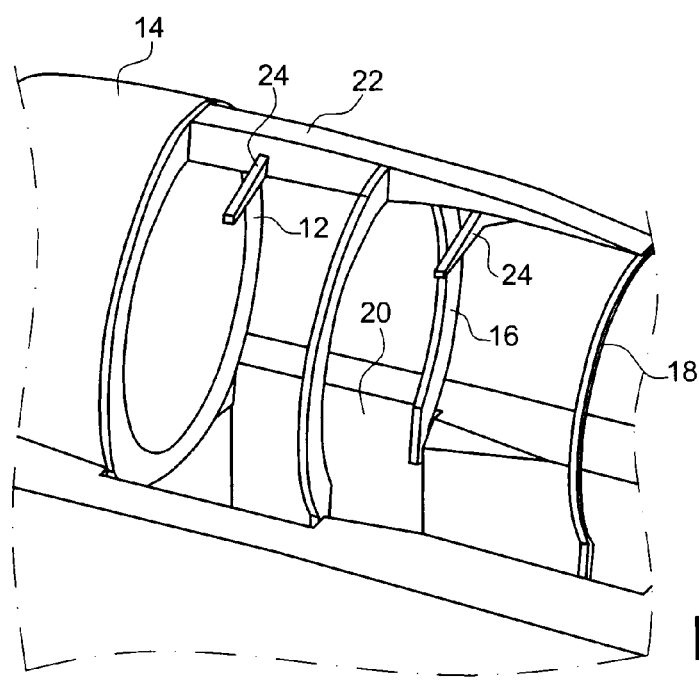
FIG. 2 is a perspective view showing the upper beam.

Represented in FIG. 2 is a perspective view showing the upper beam. The sail wing aircraft includes a first frame 12 mounted adjacent to an air inlet 14 of the engine as well as a second frame 16, and, in the example shown, a third frame 18. Frames 16 and 18 span a cut-out 20 in the fuselage 4 of the flying wing aircraft. An upper beam 22 is fixed to the first frame 12, to the intermediate frame 16 and to the third frame 18. The beam 22 includes fixtures 24 also known as bootstraps. These fixtures 24 are used for hoisting the engine through the cut-out 20. They are removable and are removed once hoisting has been completed.

Figure 3:
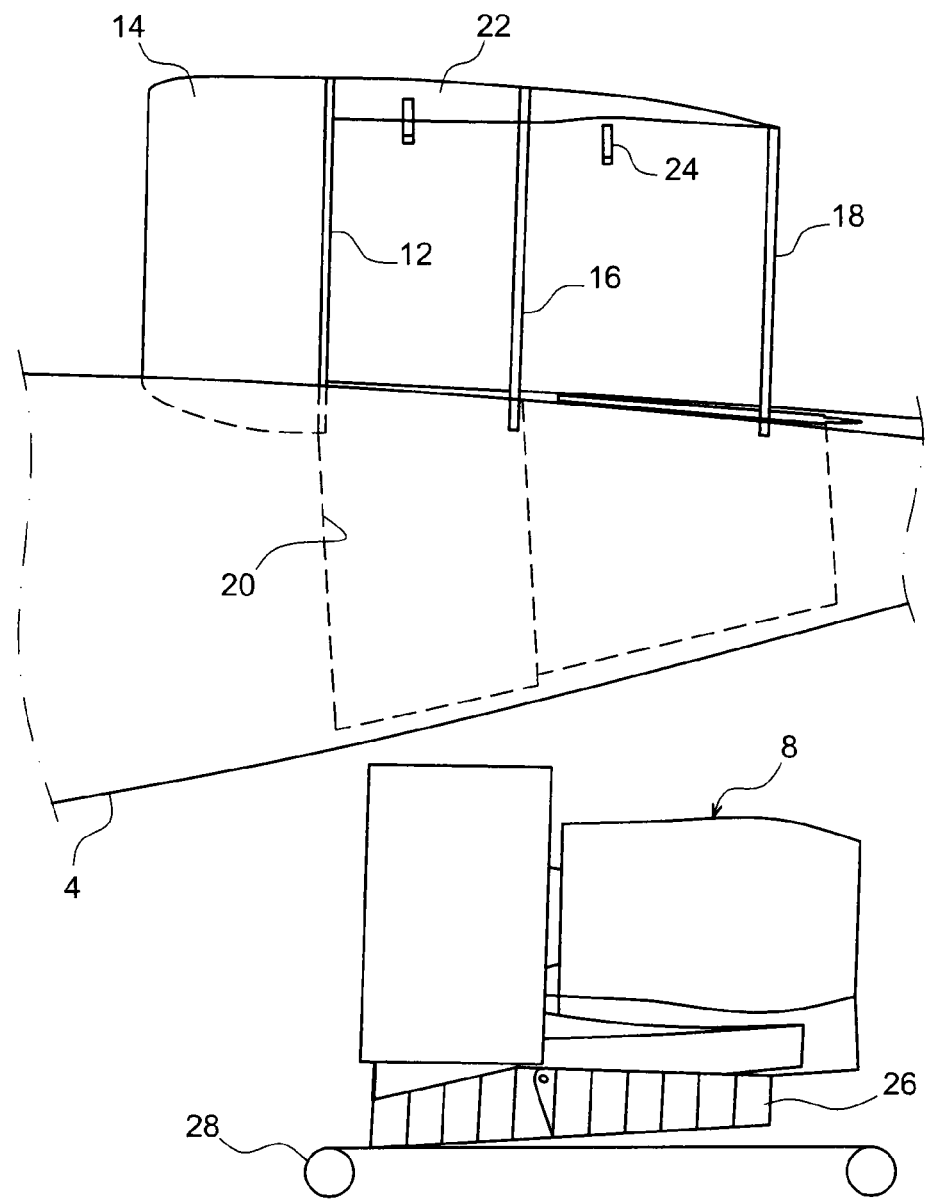
FIG. 3 is a perspective view showing the engine ready to be hoisted.

Represented in FIG. 3 is the engine 8 ready to be hoisted. The engine has been pre-assembled with the pylon 26. Using a handling truck 28 the assembly formed by the engine and the pylon is brought beneath the cut-out 20 made in the fuselage 4 of the sail wing aircraft. The engine-pylon assembly is fixed to the fixtures 24 and the engine is then hoisted until it occupies its final position. The pylon is then fixed onto the fuselage. Once this operation has been completed the assembly formed by the engine and the support pylon is released from the upper beam so that there is no longer any mechanical link between the upper beam 22 and the propulsion engine 8 after the assembly formed by the engine and the pylon has been hoisted.

Figure 4:
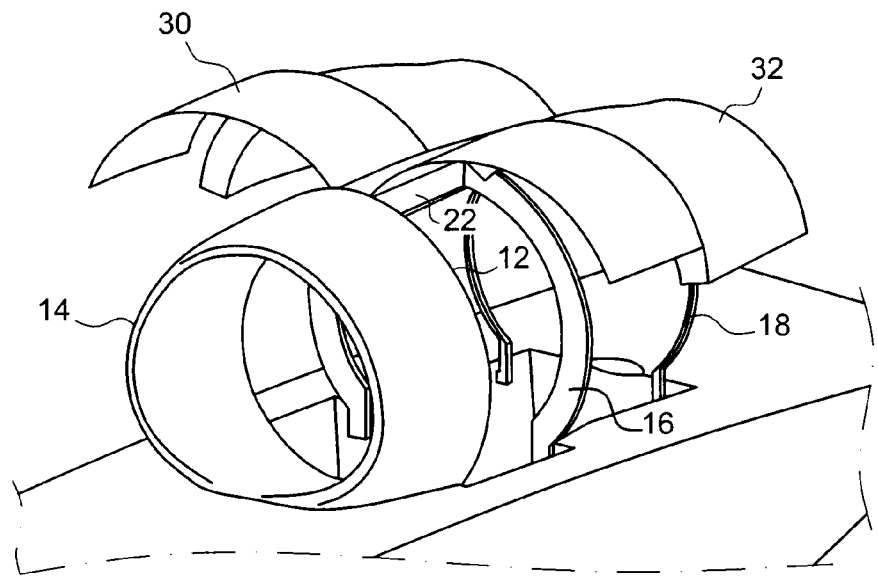
FIG. 4 is a perspective view showing the covers hinged on the upper beam.

FIG. 4 is a perspective view which shows the covers hinged on the upper beam 22. These covers are, respectively, a fan cover 30 and a thrust reverser cover 32. The fan cover 30 is hinged on the upper beam between the first frame 12 and the second frame 16, whereas the thrust reverser cover 32 is hinged between the second frame 16 and the third frame 18. In this figure the semi-recessed configuration of the air inlet 14 can also be observed.

Figure 5:
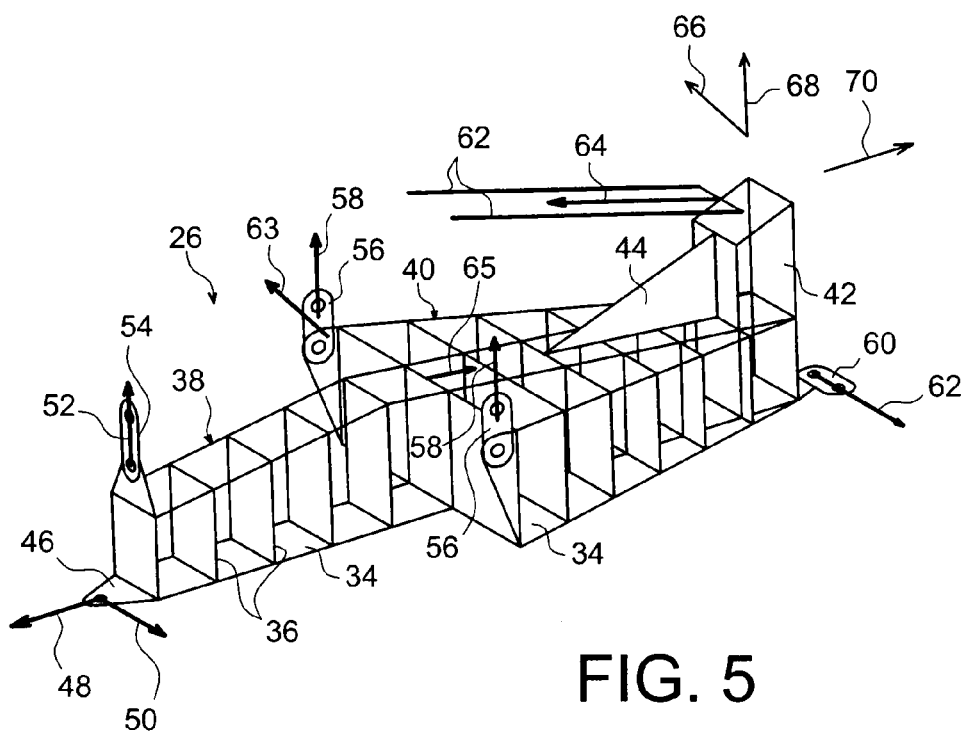
FIG. 5 is a perspective view of the pylon.

Represented in FIG. 5 is a perspective view of the pylon 26. The latter is made up of a box structure. It is made up of panels 34, onto which are fitted ribs 36 arranged perpendicularly to the panels 34. The pylon has a narrower front part 38 and a wider rear part 40. There is a column 42 at the rear of the part 40. A spar 44 connected to the rear part 40 of the pylon 26 stiffens the column 42. The pylon 26 includes fittings allowing it to be fixed to the fuselage of the sail wing aircraft. At its front part it includes a fitting 46 which bears the longitudinal forces 48 and transverse forces 50. It also includes a fitting 52 which bears the vertical forces 54. At the transition part between the wider part 40 and the narrower part 38 the pylon includes two fittings 56 arranged symmetrically relative to a plane of symmetry of the pylon. The fittings 56 bear the vertical forces, as shown schematically by the arrows 58. Finally, at the rear end of the pylon, there is a fitting 60 which bears the transverse forces 62 as shown schematically by the arrow.

In addition to the fuselage attachment points, the pylon includes engine attachment points used to fix the engine firmly to the pylon. These attachment points are made up of two attachment points 63 arranged symmetrically in relation to a longitudinal plane of symmetry of the pylon and located, longitudinally, at the transition between the narrower part 38 and the wider part 40.

Link rods 62 are fitted on the column 42. These rods are fixed to the engine. They exert a resultant force 64 on it. To the rear of the engine there are also points at which the engine is fitted onto the pylon. This fixing is brought about by means of a fitting (not shown). These points of attachment respectively bear the forces designated by references 66, 68 and 70.

Figure 6:
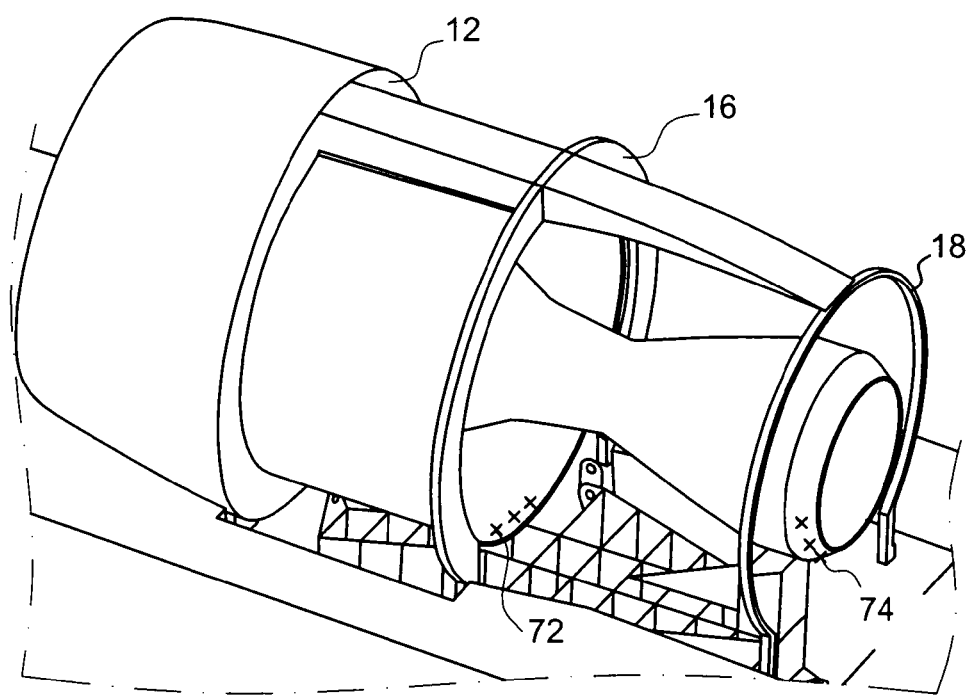
FIG. 6 is a perspective view showing the engine in the installed position.

Represented in FIG. 6 is a view showing the engine in its installed position. In this position the pylon 26 has been fixed to the structure of the sail wing as explained with reference to FIG. 5. The engine is fixed only to the support pylon 26 with no fixings to the frames 12, 16 and 18. At the bottom of the median part of the engine, note two points 72 for attaching the engine to the pylon using a fitting (not shown). The third point of attachment is in waiting. To the rear of the engine, note two points 74 for fixing to the column 42 of the pylon 26 using a fitting (not shown).

The presence of a device designed to ensure safety in the event of a component failure will also be noted. There is a fitting between the frame 16 and the engine. Under normal conditions there is no contact. In the event of failure of any of the engine support elements, the engine could fall. Thanks to this device, also known as a "fail-safe" device, the engine is stopped on this waiting fitting.

The invention claimed is:

1. A sail wing aircraft, comprising:
   a fuselage;
   a wing;
   at least one propulsion engine;
   an upper beam which is firmly fixed at its front end to a first frame located on an air inlet to the propulsion engine and which is firmly fixed at a median part to a second frame located at a rear of the first frame; and
   a pylon for attaching the engine to the fuselage, to which pylon the engine is fixed, the pylon being located below the engine and being attached to the fuselage, the pylon including two points for attachment of the pylon to the fuselage at its front end, two points for attachment of the pylon to the fuselage in its median part and a point for attachment of the pylon to the fuselage at its rear end.

2. The sail wing aircraft according to claim 1, further comprising:
   a third frame located to the rear of the second frame.

3. The sail wing aircraft according to claim 1 or 2, further comprising:
   a fan cover hinged on the upper beam between the first and second frame.

4. The sail wing aircraft according to claim 1 or 2, further comprising:
   a thrust reverser cover hinged on the upper beam to the rear of the second frame.

5. The sail wing aircraft according to claim 1 or 2, wherein the engine is connected only to the pylon and is not connected to the fuselage.

6. A sail wing aircraft comprising:
   a fuselage;
   a wing;
   at least one propulsion engine;
   an upper beam which is firmly fixed at its front end to a first frame located on an air inlet to the propulsion engine and which is firmly fixed at a median part to a second frame located at a rear of the first frame; and
   a pylon for attaching the engine to the fuselage, to which pylon the engine is fixed, the pylon being located below the engine and being attached to the fuselage, the pylon including two points for attachment of the engine to the pylon at its median part and two points for attachment of the engine to the pylon at its rear end.

7. A method for mounting a propulsion engine onto a sail wing aircraft comprising:
   providing a cut-out in a fuselage;
   providing an upper beam above the cut-out in the fuselage;
   pre-assembling the engine onto an upper portion of a support pylon;
   hoisting the assembly formed by the engine and the support pylon up through the cut-out in the fuselage by being hooked onto the upper beam;
   fixing the pylon to the fuselage such that the pylon is below the engine;
   releasing the assembly formed by the engine and the support pylon from the upper beam so that there is no longer any mechanical link between the upper beam and the propulsion engine after the assembly formed by the engine and the pylon has been hoisted.

* * * * *